March 8, 1955     H. H. SMITH     2,703,522
CITRUS FRUIT JUICER AND HOME APPLIANCE
Filed May 5, 1952     4 Sheets-Sheet 1
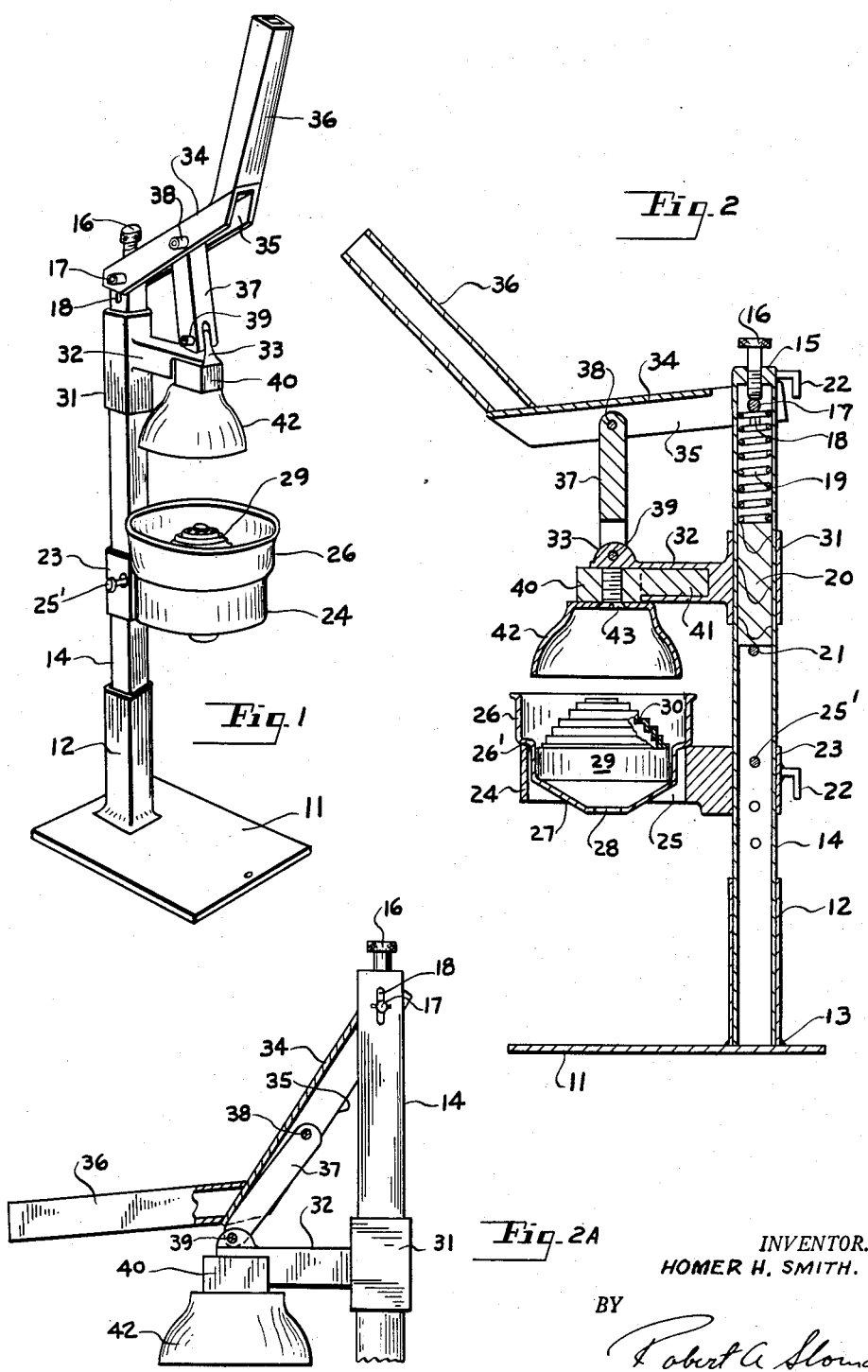
INVENTOR.
HOMER H. SMITH.
BY
Robert A. Sloman
ATTORNEY March 8, 1955  H. H. SMITH  2,703,522
CITRUS FRUIT JUICER AND HOME APPLIANCE
Filed May 5, 1952  4 Sheets-Sheet 2

INVENTOR.
HOMER H. SMITH.
BY
Robert A. Sloman
ATTORNEY

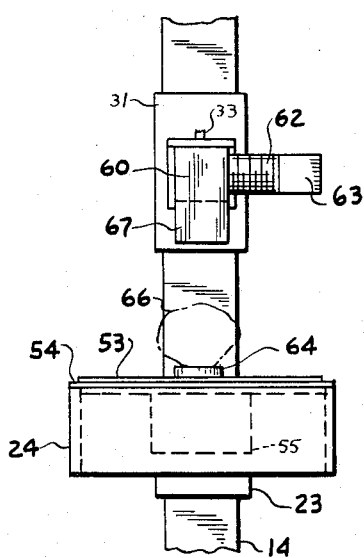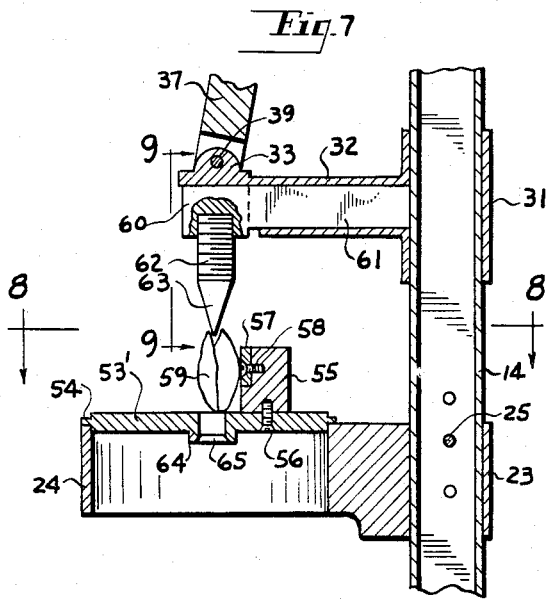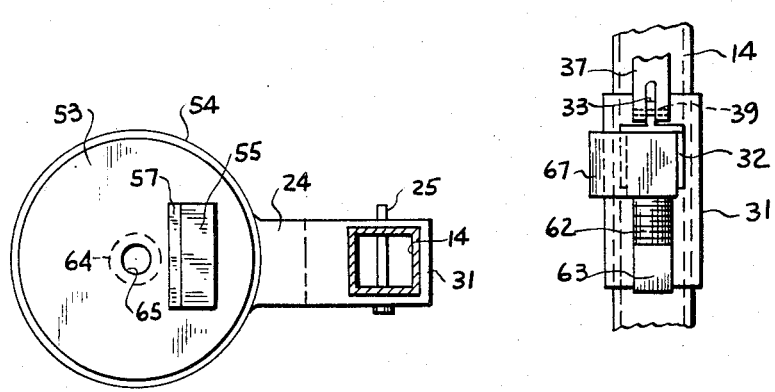

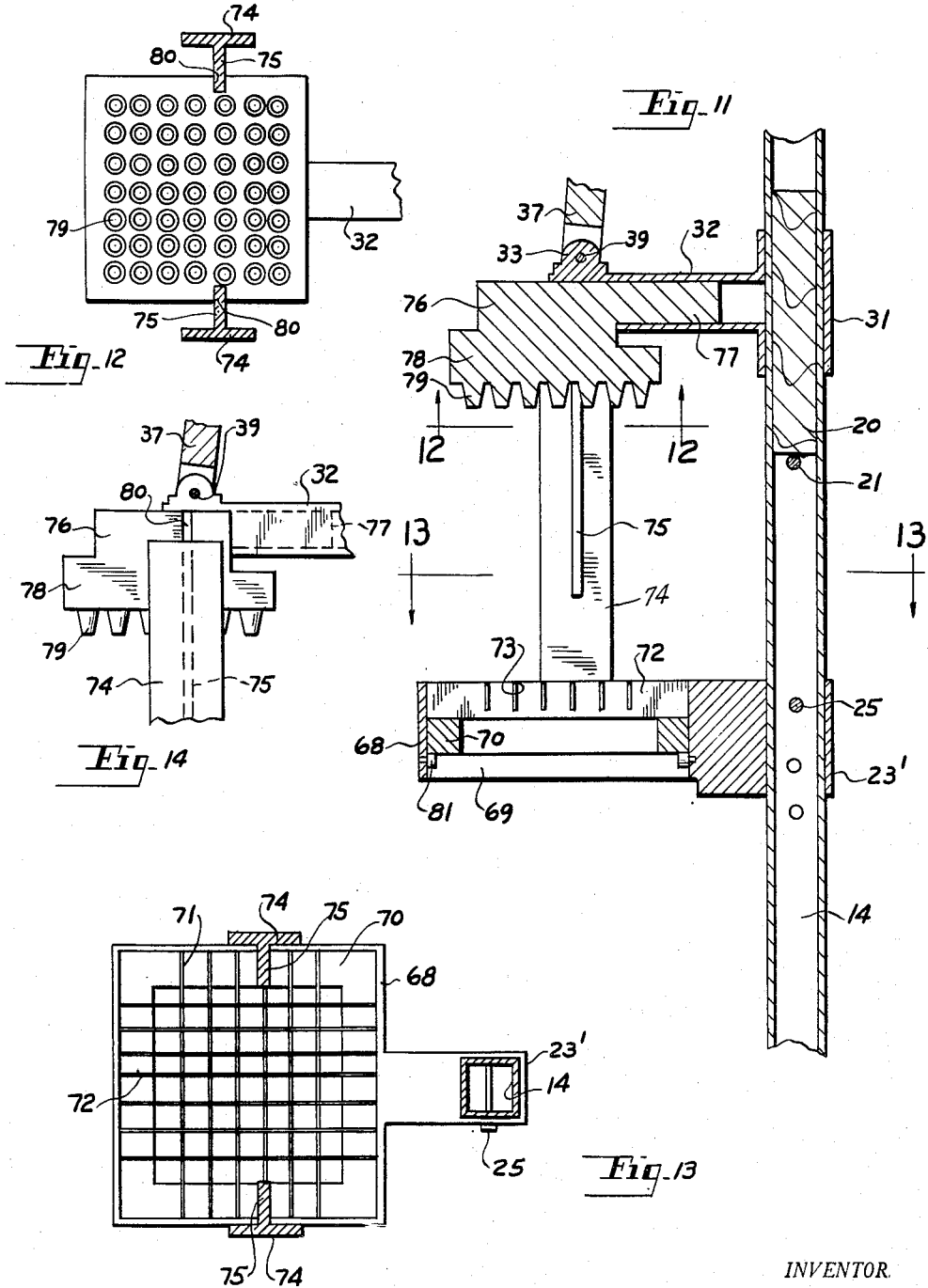

United States Patent Office 2,703,522
Patented Mar. 8, 1955

2,703,522

CITRUS FRUIT JUICER AND HOME APPLIANCE

Homer H. Smith, Detroit, Mich.

Application May 5, 1952, Serial No. 286,120

4 Claims. (Cl. 100—283)

This invention relates to a citrus fruit juicer, and more particularly to a home appliance adapted for use as a fruit juicer, which is also adapted for many other domestic uses. This application is a continuation in part of my co-pending patent application for a citrus fruit juicer, Serial Number 234,530, filed June 30, 1951 and which is now Patent No. 2,692,550, issued October 26, 1954.

It is the object of the present invention to provide a novel citrus fruit juicer construction which is compact, inexpensive to manufacture and fully efficient for the intended purpose.

It is the object of the present invention to provide a novel fruit juicer construction which may be adapted for other uses by employing certain attachments and generally utilizing the mechanical construction of the juicer. For example, with certain attachments the present construction may be employed as a potato ricer, a device for shredding potatoes, an oyster splitting device, or a nut cracking device.

It is the further object of this invention to provide a novel citrus fruit juicer construction which may be changed over to any of the other appliances above set forth with only slight changes in the construction of the stationary and movable anvils forming a part thereof.

These and other objects will be seen from the following specification and claims in conjunction with the appended drawings in which:

Fig. 1 is a perspective view of the citrus fruit juicer with the movable anvil in its highest position.

Fig. 2 is an elevational section of the same showing the movable anvil in an intermediate position.

Fig. 2A is a fragmentary side elevational view of a portion of the fruit juicer illustrating the positioning of the anvil when in its lowermost position.

Figure 4:
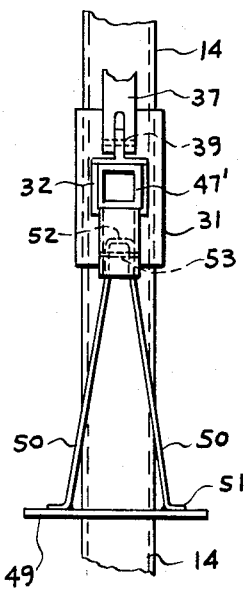
Figure 3:
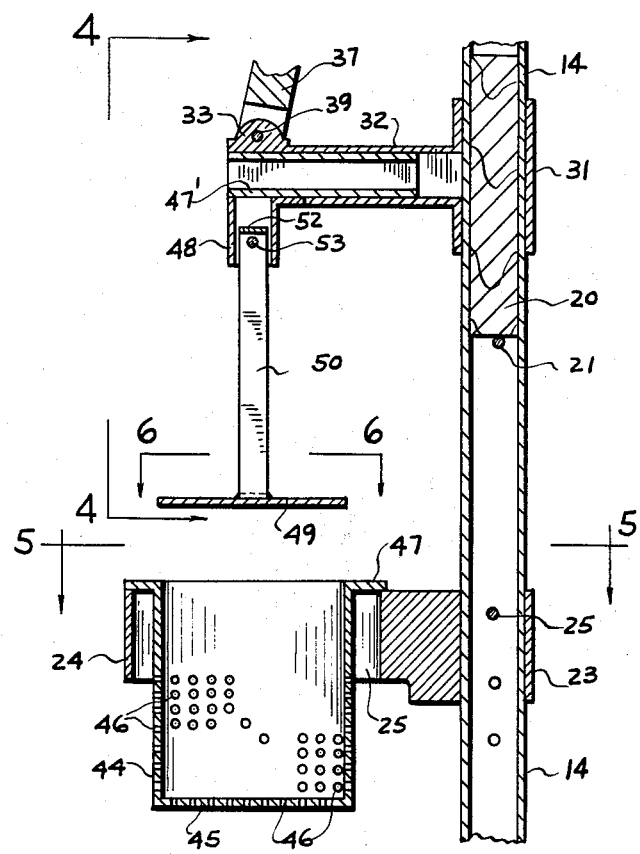
Fig. 3 is an elevational section fragmentarily shown of the present juicer construction which has been adapted as a potato ricer.
Figures 5, 6:
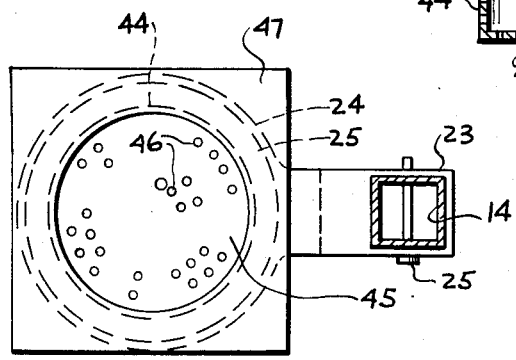

Fig. 4 is a section taken on line 4—4 of Fig. 3.
Fig. 5 is a section taken on line 5—5 of Fig. 3.
Fig. 6 is a section taken on line 6—6 of Fig. 3.
Fig. 7 is a fragmentary elevational section of the present juicer construction which has been adapted as an oyster splitter.

Fig. 8 is a section taken on line 8—8 of Fig. 7.
Fig. 9 is a section taken on line 9—9 of Fig. 7.
Fig. 10 is a fragmentary front elevational view of the structure shown in Fig. 7, but with the stationary anvil element inverted and with a portion of the movable anvil rotated 90 degrees from the position shown in Fig. 7 to provide a nut cracker construction.

Fig. 11 is a fragmentary elevational section of the juicer construction which has been adapted as a potato shredding device.

Fig. 12 is a section taken on line 12—12 of Fig. 11.
Fig. 13 is a section taken on line 13—13 of Fig. 11.
Fig. 14 is a fragmentary side elevational view illustrating the construction of the movable anvil of the vegetable shredding device shown in Fig. 11.

It will be understood that the above drawings illustrate merely the preferred embodiments of the invention, and that other embodiments are contemplated within the scope of the claims hereafter set forth.

Referring to Figs. 1, 2, and 2A, the citrus fruit juicer includes the horizontal platform 11, and mounted thereon is an upright sleeve 12 which is welded at its lower end to platform 11 as by the welds 13. The upright hollow standard 14, preferably rectangular in cross-section, or square in cross-section, is slidably and snugly positioned within the sleeve 12, the upper end of standard 14 having enclosure plate 15 thereupon within which is threaded the vertically arranged adjusting screw 16.

The lower end of screw 16 bears against the transverse pivot pin 17, which extends through the oppositely arranged slots 18 adjacent the upper end of standard 14, such pin being vertically adjustable within said slots.

The coiled spring 19 is positioned within standard 14 adjacent its upper end, with said spring resting upon the block 20 supported within standard 14 by means of the transverse pin 21. The upper portion of spring 19 supports the transverse pivot pin 17 in the manner illustrated in Fig. 2.

A pair of vertically aligned down-turned bracket elements 22 are shown secured to the upright standard 14 whereby said standard may be adjustably mounted in an upright position upon a wall or other upright member. In that case the platform 11 and the sleeve 12 would be omitted.

A stationary anvil is provided upon the standard 14 and consists of an upright cylindrical element 24 having a central upright opening 25 and also having a laterally positioned collar 23 which is slidably mounted upon standard 14 and secured in position by the transverse locking pin 25'. L shaped mounting hook 22 is secured at one end to collar 23.

The circular cup 26 is mounted upon stationary anvil 24 and depends downwardly therethrough with its annular shoulder 26' bearing upon the top surface of stationary anvil 24, as illustrated in Fig. 2. The lower portion of the cup has circular converging wall portions 27 which terminate in the outlet opening 28 through which the juice may be delivered downwardly into a suitable receptacle which may be mounted upon the platform 11.

A conventional circularly shaped fruit supporting cup 29 is mounted within the lower portion of cup 26 and includes a plurality of annular stepped portions of gradually reduced diameter towards the upper end thereof for cooperation with an inverted half of a fruit inserted within the cup 26. There are a plurality of vertical perforations 30 formed within the cup element 29 to permit the expressed juice to descend down into the bottom element 27 of the cup 26 and out through the passage 28 in a conventional manner.

There is also provided a vertically adjustable anvil which includes the laterally arranged sleeve 32 having a laterally extending opening therein throughout its length, said sleeve terminating in the upright laterally positioned collar 31 which has an upright opening which is square or rectangular in cross-section, and which is adapted to loosely receive the upper portion of the standard 14. Thus the movable anvil is vertically adjustable upon said standard by means hereafter described. Said anvil includes an upright flange 33 which is connected with the operating arm 34 by means of a link 37. Said link is pivotally joined at its upper end by the pin 38 to the operating arm 34 intermediate the ends of said operating arm. The lower end of the link 37 has a vertical slot formed therein to receive the flange 33 which is pivotally joined thereto by the transverse pin 39.

It will also be noted from Fig. 2 that the operating arm 34 is pivotally mounted upon the upper end of the standard 14 by means of the transverse vertically adjustable pin 17. The operating arm 34 has a pair of spaced depending flanges 35 which extend upon opposite sides of the standard 14 at its upper end and through which the pivot pin 17 extends for supporting said operating arm in the manner illustrated in the drawing. Operating arm 34 also has an angularly arranged extension handle 36 to facilitate operation of the operating arm.

The vertically adjustable anvil also includes the block 40 which has a laterally extending shaft 41, preferably of rectangular or square cross-section adapted for slidable positioning within a lateral opening in sleeve 32 in the manner shown in Fig. 2. Block 40 also has centrally secured thereto the inverted fruit compressing cup element 42 secured thereto as by the upright screw 43.

The upper anvil element may be easily removed for cleaning or replacing with other devices hereafter described.

In operation it is seen that the lower anvil elements are secured in a stationary relation upon the standard 14 and the upper anvil elements are vertically adjustable with respect to said standard. The movable anvil elements are positioned directly above the stationary anvil elements and from an examination of Fig. 2 inverted cup 42 co-operates with the cup 26 and the fruit receiving cup element 29; so that upon pivotal downward movement of the operating arm 34, through the action of the link 37, the juice will be expressed from the fruit and will drop through the outlet 28.

Fig. 1 illustrates the position of the movable anvil in its fully elevated position when not in use. Fig. 2 shows an intermediate position of the movable anvil; whereas Fig. 2A shows fragmentarily the relative positioning of the parts when the anvil is in its lowermost compressing position. It is important to note that as illustrated in Fig. 2A, when the anvil 42 is in its lowermost position it is locked in that position inasmuch as the pivot point 38 between the link 37 and arm 34 has passed beyond a straight line between pivot point 17 and the lower pivot point 39 between the anvil 37 and the flange 33.

The passing of pivot point 38 to the off-center position shown in Fig. 2A effectively locks the lower anvil in its lowermost position so that it is maintained at substantially its most effective fruit expressing position.

It will be noted also that the adjusting screw 16 may be regulated as desired to thereby limit the upward positioning movement of the transverse pin 17 upon which the operating arm 34 is pivoted. In use it may be desirable that the pin 17 be lower or higher than the position shown in Fig. 2A, for example. Consequently, the pin 17 has a floating mounting upon the spring 19 thereby to provide an improved relationship between the operating arm 34 and the standard 14 throughout the fruit expressing operating.

To change the present citrus fruit juicer to a potato ricer, for example, it is merely necessary to remove elements 26 and 29 shown in Fig. 2 and in their place substitute the upright cylinder 44 which has a bottom wall 45 with the circular perforations 46 throughout as shown in Fig. 3. Cylinder 44 has a rectangular flange 47 at its upper end which rests upon stationary anvil 24 as shown.

Furthermore, the block 40 has been slidably removed from the sleeve 32 and in its place there has been substituted a laterally arranged hollow sleeve 47' of square cross-section slidably positioned within the sleeve 32 as shown in Fig. 3. The element 47' also has a downwardly depending tubular portion 48 which is open at its lower end and which is adapted to receive the upper end 52 of the diverging straps or links 50, whose out-turned feet 51 are secured to the circular disc 49 adapted for snug sliding movement within the cylinder 44 for compressing a cooked potato therein for ricing the same. The upper end 52 of the supporting straps or links 50 is pivotally secured within the depending tubular element 48 by means of a transverse pin 53. Consequently, the disc 49 is pivotally adjustable for properly centering the same within the cylinder 44.

In this case the upper anvil or vertically adjustable anvil has been changed from a fruit juice expressing device to a potato ricer merely by the removal of the block 40 and its shaft 41 from the device shown in Fig. 2 and the substitution in its place within sleeve 32 of a potato ricing mechanism together with the depending parts above described.

The operating of the potato ricing device is exactly the same as the operation of the fruit juice expressing mechanism described in connection with Figs. 1 and 2 and 2A. Consequently, the fruit expressing device can be easily changed over to a potato ricing mechanism as above described.

The present orange juicer mechanism may also be changed and utilized for other purposes as, for example, for splitting oysters, as illustrated in Figs. 7, 8 and 9 of the drawings.

In the changeover from the orange juicer device of Figs. 1, 2 and 2A, it is again necessary to remove the elements 26 and 29 as well as the block 40 which supports the inverted cup 42.

Upon the stationary anvil 24 there is positioned the horizontally arranged circular plate 53', which has an annular peripheral flange 54 which rests upon the outer peripheral edge of the stationary anvil 24 in the manner shown in Fig. 7; with a portion of plate 53' depending downwardly into anvil 24 and horizontally immovable therein.

The upright rectangularly shaped block 55 is secured by the screws 56 to the top surface of plate 53', and said block has a cut-away portion upon its upper outer edge adapted to receive the removable plate 57 which is secured to said block by the transverse screws 58, one of which is shown in Fig. 7.

The oyster shell to be split is mounted in an upright position as at 59 upon the plate 53' and preferably bears against the block 55 or the plate 57 secured thereto.

The block 40 of Fig. 2 has been replaced by a head 60 with a laterally extending shank 61 of square cross-section which is slidably and snugly positioned within the laterally extending sleeve element 32 upon the vertically adjustable collar 31 as illustrated in Fig. 7. The upright shaft 62 is threadably or otherwise secured to and depends from the block 60, the lower portion of said shaft 62 being of wedge shape as at 63 for cooperative splitting engagement with the edge of an oyster 59 in the manner illustrated in Fig. 7. As the movable anvil 60 is moved downwardly in the manner described the oyster will be split open, the block 55 acting as a lateral support for the oyster shell.

It will be noted that there is provided a central circular boss 64 upon the under-surface of the plate 53' and that there is a central transverse aperture 65 extending through said plate.

In order to change over the oyster splitting device to a nut cracking device, it is merely necessary to invert the plate 53' to the position shown in Fig. 10.

Referring to Fig. 10, it is seen that the block 60 has been rotated 90 degrees counter-clockwise from the position shown in Fig. 7, and shaft 62 is now in a horizontal position as shown in Fig. 10.

The head 60 has the now depending boss or projection 67 which is adapted for cooperative compressing registry with a portion of the nut 66 mounted within and upon the boss 64. The action and operation of the device is exactly the same as above described inasmuch as downward movement of the movable anvil will break or crush the nut 66.

The present orange juicer device may also be changed over to a potato shredding device or other vegetable shredding device by the structure or variations thereof shown in Figs. 11–14. In that case there are some changes in the stationary and movable anvils now to be described.

Referring to Fig. 11, there is shown the stationary anvil 68, which has an upright hollow opening 69, preferably rectangular or square in cross-section as shown in Figs. 11 and 13, together with a laterally extending sleeve 23' which is slidably positioned over the upright standard 14 and secured thereto in a desired vertically adjusted position by means of the transverse pin 25. The stationary anvil may be adjusted vertically in view of the plurality of transverse openings within the standard 14 within which the pin 25 may be selectively positioned and secured.

The stationary anvil for the potato shredding device includes the hollow rectangular block 70 on which are secured in upright position a plurality of sharpened blades 71 arranged in parallel spaced relation and mounted upon the said block.

There are also provided a plurality of transverse parallel spaced sharpened upright blades 72, also secured on the block 70 and arranged in interlocking relation with the blades 71.

It will be noted from Fig. 11 that all of the sharpened edges 73 of the blades 71 and 72 are arranged in substantially the same horizontal plane. In operation it is contemplated that the potato to be shredded is mounted loosely upon the top surfaces of the blades 71 and 72 directly below the movable anvil shown in Fig. 11.

A pair of spaced upright guide elements for the vertically adjustable anvil 76 are provided, being of substantially T shape in cross-section. Said guide elements include the upright strips 74 and the upright inwardly directed guide elements 75 which are received slidably within the upright slots 80 formed within opposed side portions of the vertically adjustable anvil, in the manner illustrated in Figs. 12 and 14.

Referring again to Fig. 11, the vertically adjustable anvil 76 includes the laterally extending shaft 77, which is preferably square in cross-section, and adapted to snugly slide within the laterally extending sleeve element 32 upon the collar 31 mounted upon the standard 14. Anvil 76 includes the depending block 78, which is generally square in cross-section as shown in Fig. 12, and which has a plurality of projections 79 of decreasing diameter arranged in a plurality of rows across the entire undersurface of the block 78. Each of the respective projections 79 are adapted for registry within one of the rectangular openings defined by four intersecting blades 71 and 72.

It is contemplated therefore that these circular projections 79 upon the under surface of the block 78 compressively bear against a portion of the potato or other vegetable positioned upon the blades 71 and 72 for projecting the same downwardly with respect to said blades and for shredding the vegetable or potato therethrough. The block 70 has a central opening so that the shredded vegetable will drop downwardly through said block into a suitable receptacle which may be provided upon the horizontal platform 11, which is illustrated in Fig. 1.

The upright slots 80 formed within the block 78 cooperate with the guide elements 75 for guiding the vertical movement of the anvil 76 for operation in the manner above described in connection with the operation of the juicer, the potato ricer, the nut cracker or the oyster splitter.

Referring to Fig. 11, the blade supporting block 70 is positioned within the stationary anvil 68 and rests upon the stops 81, which are diametrically arranged upon the interior of stationary anvil 68 for supporting said block during the operation of the device.

In each of the illustrations above described the operation of the linkage is exactly the same with the operating arm 34 and its handle 36 functioning to movably and downwardly project the vertically adjustable anvil with respect to the standard, in view of the interconnecting link 37 between the operating arm 34 and the movable anvil.

As above described in Figure 2A in each of these cases the operating arm will be locked in its lowermost position when the pivot point 38 has moved to an off-center position with respect to a line connecting pivot pin 17 and pivot pin 39. This important feature is present in each of the embodiments illustrated in the drawings and above described inasmuch as it maintains the movable anvil in its lower most position.

Having described my invention, reference should now be had to the claims which follow for determining the scope thereof.

I claim:

1. In combination, an upright standard, a laterally positioned stationary anvil secured thereon, a horizontally disposed sleeve open at one end, an upright collar upon its other end slidably mounted upon the standard, a vertically reciprocable anvil positioned above said stationary anvil for compressive registry therewith, a shaft projecting laterally from said last anvil removably positioned within said sleeve, an operating arm pivotally mounted at one end upon said standard above said movable anvil, and a link pivotally joined at one end to an intermediate portion of said arm and pivotally joined at its other end to said sleeve, said standard having a transverse vertically elongated slot adjacent its upper end, the pivotal mounting of said arm including a transverse pin on said arm extending through said slot and vertically movable therein.

2. In combination, an upright standard, a laterally positioned stationary anvil secured thereon, a horizontally disposed sleeve open at one end, an upright collar upon its other end slidably mounted upon the standard, a vertically reciprocable anvil positioned above said stationary anvil for compressive registry therewith, a shaft projecting laterally from said last anvil removably positioned within said sleeve, an operating arm pivotally mounted at one end upon said standard above said movable anvil, a link pivotally joined at one end to an intermediate portion of said arm and pivotally joined at its other end to said sleeve, said standard having a transverse vertically elongated slot adjacent its upper end, the pivotal mounting of said arm including a transverse pin on said arm extending through said slot and vertically movable therein, and a spring anchored within said standard and supportably engaging said pin.

3. In combination, an upright standard, a laterally positioned stationary anvil secured thereon, a horizontally disposed sleeve open at one end, an upright collar upon its other end slidably mounted upon the standard, a vertically reciprocable anvil positioned above said stationary anvil for compressive registry therewith, a shaft projecting laterally from said last anvil removably positioned within said sleeve, an operating arm pivotally mounted at one end upon said standard above said movable anvil, a link pivotally joined at one end to an intermediate portion of said arm and pivotally joined at its other end to said sleeve, said standard having a transverse vertically elongated slot adjacent its upper end, the pivotal mounting of said arm including a transverse pin on said arm extending through said slot and vertically movable therein, a spring anchored within said standard and supportably engaging said pin, and an adjusting screw threaded downwardly into said standard operatively engaging said pin for determining with the spring the vertical positioning of said pin within said slot.

4. In combination, an upright standard, a laterally positioned stationary anvil secured thereon, a horizontally disposed sleeve open at one end, an upright collar upon its other end slidably mounted upon the standard, a vertically reciprocable anvil positioned above said stationary anvil for compressive registry therewith, a shaft projecting laterally from said last anvil removably positioned within said sleeve, an operating arm pivotally mounted at one end upon said standard above said movable anvil, and a link pivotally joined at one end to an intermediate portion of said arm and pivotally joined at its other end to said sleeve, the cross-sectional shape of said shaft being the same as the cross-sectional shape of said opening for maintaining said movable anvil in an upright position, said anvils having means adapted to operate on food to prepare the same for eating.

References Cited in the file of this patent

UNITED STATES PATENTS

| | | |
|---|---|---|
| 226,166 | Fanning | Apr. 6, 1880 |
| 507,383 | O'Connell | Oct. 24, 1893 |
| 984,649 | Dafoe | Feb. 21, 1911 |
| 1,042,691 | Kouyoumjian | Oct. 29, 1912 |
| 1,732,353 | Bradley | Oct. 22, 1929 |
| 1,867,657 | Dellinger | July 19, 1932 |
| 1,958,570 | Flegel | May 15, 1934 |
| 2,200,032 | Lovelace | May 7, 1940 |
| 2,455,267 | Pacotto | Nov. 30, 1948 |
| 2,551,886 | Jones | May 8, 1951 |
| 2,572,378 | Paul | Oct. 23, 1951 |